(No Model.)

G. BURHANS.
HORSESHOE PAD.

No. 371,301. Patented Oct. 11, 1887.

WITNESSES:
F. N. Rosenbaum.
Carl Karp

INVENTOR
George Burhans
BY
Goepel & Raegener
ATTORNEYS.

UNITED STATES PATENT OFFICE.

GEORGE BURHANS, OF CARLISLE CENTRE, NEW YORK.

HORSESHOE-PAD.

SPECIFICATION forming part of Letters Patent No. 371,301, dated October 11, 1887.

Application filed January 17, 1887. Serial No. 224,573. (No model.)

*To all whom it may concern:*

Be it known that I, GEORGE BURHANS, of Carlisle Centre, in the county of Schoharie and State of New York, have invented certain new and useful Improvements in Horseshoe-Pads, of which the following is a specification.

This invention relates to an improved device of that class by which protection is given to the under side of the hoof, and the so called "balling" of snow or dirt prevented.

The invention consists of a horseshoe-pad composed of a stout sheet-metal plate interposed between the hoof and the shoe, a rubber cushion at the upper side of said sheet-metal plate, a re-enforcing leather piece at the under side of the plate and within the shoe, and a facing of sheet metal, said sheet-metal plate, cushion, re-enforcing leather, and facing being riveted together, and the pad being provided with a central V-shaped recess for clearing the frog of the hoof.

Figure 1:
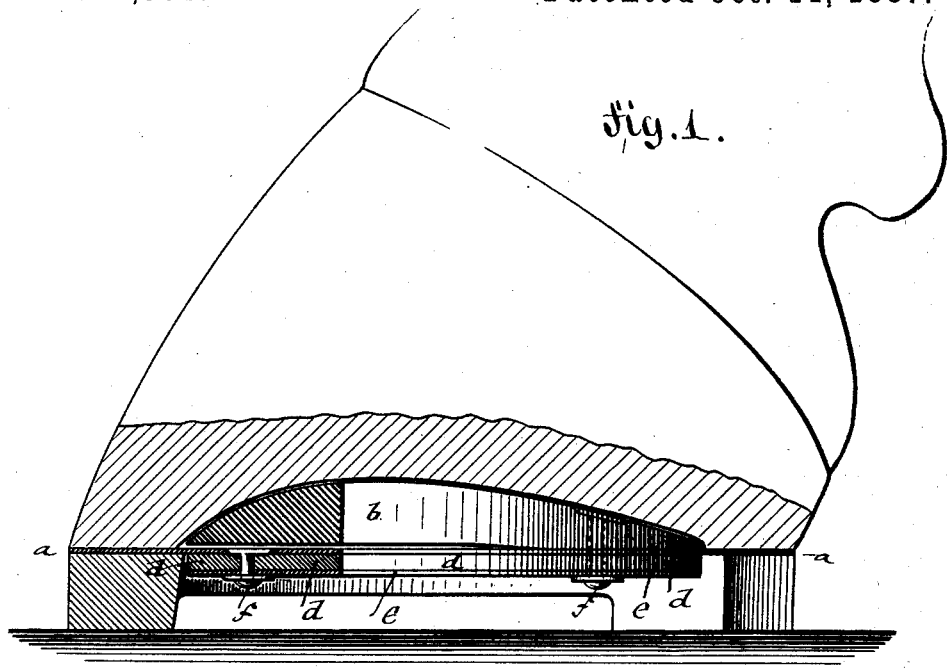
Figure 2:
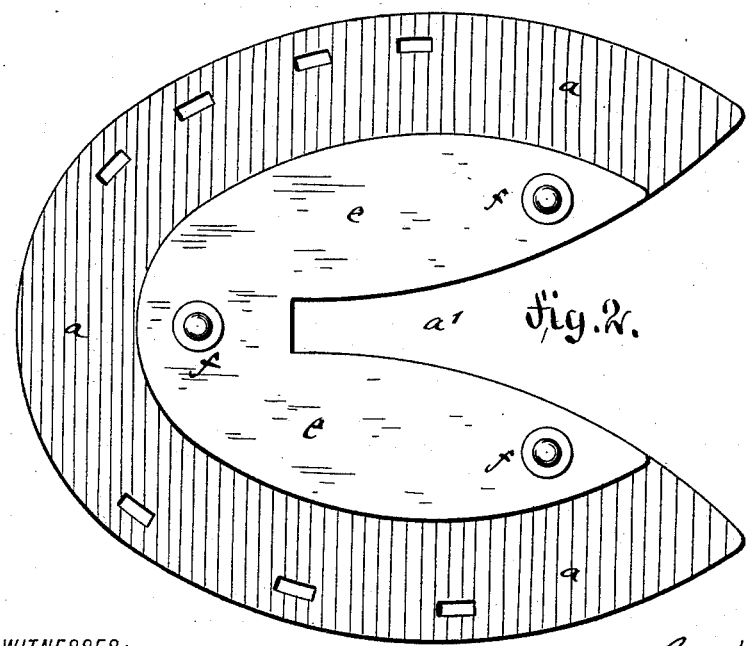

In the accompanying drawings, Figure 1 represents a vertical central section of the foot of a horse, showing my improved pad in position between the hoof and the shoe; and Fig. 2 is a bottom view of my improved pad.

Similar letters of reference indicate corresponding parts.

My improved horseshoe pad is composed of a sheet-metal plate, $a$, of the size and shape of the hoof, which plate is interposed by its outer part or flange between the hoof and the shoe, as shown in Fig. 1, and attached, with the shoe, to the hoof by the horseshoe nails, the plate $a$ being provided with holes for the nails, which holes register with the holes of the shoe. The plate $a$ is provided with a V-shaped recess, $a'$, so as to clear the frog of the hoof, and provided at its upper part with a tapering cushion, $b$, of soft rubber or other elastic material, said cushion being made tapering at the edge and adapted to fit into the concavity at the under side of the hoof, the cushion being also recessed, so as to correspond to the shape of the plate $a$.

To the under side of the plate $a$ is applied a re-enforcing leather plate, $d$, at the inside of the shoe, which plate is again faced, especially when exposed to heavy wear, by a plate of suitable sheet metal, so as to protect the leather against too rapid wear. The leather plate and facing are also recessed to conform to the shape of the main plate $a$. The main plate, rubber cushion, re-enforcing leather plate, and facing of sheet metal are fastened together by rivets or otherwise, so as to form a pad that protects the hoof and prevents the balling of the snow or dirt in the hollow of the same.

The pad is of strong and durable construction and forms an effective protecting device for the horse's hoof, that can be readily applied by the blacksmith when shoeing the same.

I am aware that horseshoe-pads of different construction have been used heretofore for the purpose of protecting the hoof, and I therefore do not claim this feature broadly.

Having thus described my invention, I claim as new and desire to secure by Letters Patent—

A horseshoe-pad composed of a recessed sheet-metal plate the outer part or flange of which is interposed between the shoe and hoof, an elastic cushion having tapered edges located at the upper side of the sheet-metal plate, the upper surface of said cushion being curved, so as to fit snugly into the concavity in the under side of the hoof, a re-enforcing leather pad on the under side of the metal plate, and rivets for connecting the main plate, the rubber cushion, and leather plate, substantially as shown and described.

In testimony that I claim the foregoing as my invention I have signed my name in presence of two subscribing witnesses.

GEORGE BURHANS.

Witnesses:
 MELVIN BURHANS,
 EMMETT SNYDER.